April 11, 1939.　　　　B. H. MILLER　　　　2,154,407
JOINTED CONDUIT
Filed Feb. 4, 1937
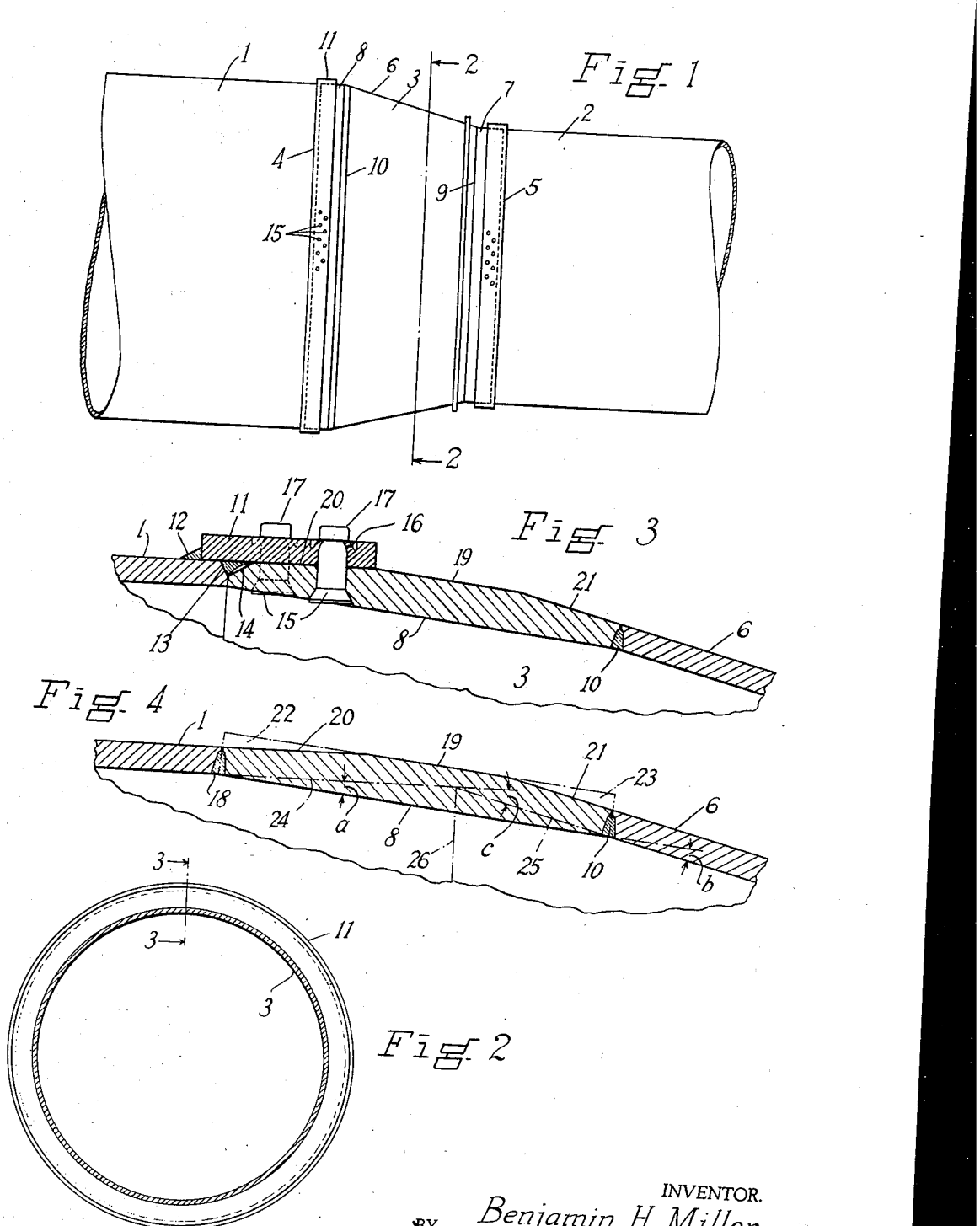
INVENTOR.
Benjamin H. Miller
BY
ATTORNEY.

Patented Apr. 11, 1939

2,154,407

UNITED STATES PATENT OFFICE 2,154,407

JOINTED CONDUIT

Benjamin H. Miller, Wadsworth, Ohio, assignor to The Babcock & Wilcox Company, Newark, N. J., a corporation of New Jersey Application February 4, 1937, Serial No. 123,988

5 Claims. (Cl. 285—111)

The invention has reference to a conduit system comprising a plurality of component conduit lengths joined together in end to end relation, and more specifically concerns the formation of a suitable connection between conduit lengths of different internal dimensions.

In a conduit system involving transition from one diameter to another it is desirable to avoid abrupt changes in the flow area and the usual procedure is to employ a conical fitting of uniform taper and thickness which is connected, at its opposite ends, to the cylindrical sections of different diameters. Such prior art construction may be entirely suitable under conditions where the parts are subjected only to very low stresses due to such factors as their size, weight, the method of support and the character of fluid which the conduits are intended to convey.

Other conditions, however, may present entirely different problems and require that the conduit parts be capable of resisting high static loads and other forces of great magnitude, and it is to this class of apparatus that this invention finds particular application. A pertinent example of apparatus representative of the latter class is found in the well known installation at Boulder Dam where the various penstocks and other conduit members range in sizes from an inside diameter of about 8½ feet to an inside diameter of 30 feet. It can be readily appreciated that all component parts of such conduits must be proportioned with due consideration of the character and magnitude of all forces which act to place the construction under stress.

The problem is particularly acute at locations where a change is made in the conduit diameter because there is not only the flow resistance to be considered but other factors such as the stress within the reducer or transition member and the stresses at the junctures of such a member with the cylindrical sections connected thereby in order to maintain the existing stresses in the parts within safe working limits with a substantially uniform distribution of stress throughout the parts, and to preserve fluid-tight conditions at the joints.

When a connection is made between a conically formed member and a cylindrically formed conduit section the stresses in the materials at the point of connection are greater than those either in the plain cone or in the cylinder, thus necessitating especial care in the determination of the particular type of construction to meet the requirements.

An object of my invention, therefore, is a method in the formation of a joint between a conical member and a cylindrical member which will serve to bring about a reduction in the unit stresses.

Another object is to provide a form of connecting member between conduit sections of different diameters which will afford a progressively varying flow area throughout its length, including a reenforcement of the member adjacent its connection to a cylindrical section.

A further feature of the invention resides in the formation of a generally tapered form of connecting member for joining conduits of different diameters which includes a plurality of axially connected conical elements of different angularity.

Additional features include the formation of an intermediate connecting member of generally tapered form which includes an end portion of more gradually varying taper than the taper at other portions of its length.

These and other purposes of my invention will be apparent from the specification which follows and from the accompanying patent drawing, in which:

Fig. 1 is a side elevation of a length of conduit to which the invention is applied;

Fig. 2 is a sectional view of the conduit taken along the line 2—2 of Fig. 1;

Fig. 3 is a fragmentary view in longitudinal section along the line 3—3 of Fig. 2 showing details of construction;

Fig. 4 is a fragmentary view in longitudinal section corresponding to Fig. 3 but illustrating a modification.

Referring now to details of the drawing, the length of conduit illustrated in Fig. 1 comprises the cylindrical section 1 of large diameter and the cylindrical section 2 of smaller diameter with an intermediate connecting member or reducer 3 having its ends connected at 4 and 5 respectively to the cylindrical sections 1 and 2. The member 3, as shown, includes an intermediate conical member 6, of uniform taper and thickness throughout its length, connected at its smaller diameter to the cylindrical end member 7, and a transition piece 8 connected to the larger end of the cone 6, the connections between the member 6 and the terminal portions 7 and 8 being preferably made by welding as at 9 and 10 to form the unitary connecting member 3 for assembly between the cylindrical sections 1 and 2.

The joint between the reducer 3 and the larger conduit may be of the form illustrated in Fig. 3 which corresponds to the pinned type of girth joint disclosed in the copending patent application of S. C. Hollister et al., Ser. No. 741,906, filed August 29, 1934, since matured into Patent 2,121,035, dated June 21, 1938. In general, a connection of this type comprises an outer buttstrap 11 welded to the larger cylindrical section 1 at 12 and 13, thus forming a belled-end at the end of that section within which the free end of the transition piece 8 is received, the beveled edge 14 of the piece 8 providing a clearance for the weld 13. The pins 15 are arranged in staggered rows circumferentially of the conduit and pass through registering holes in the buttstrap and the transition piece, the pins being undercut at 16 to provide circular recesses into which the buttstrap metal is peened against the pin heads 17.

Another and somewhat more elementary form which the invention may take is shown in Fig. 4 where the reducer 3 is welded to a cylindrical conduit section, the welded connection 18 being made between the adjacent ends of the transition piece 8 and the cylindrical section 1.

The connection between the reducer 3 and the smaller conduit section 2 may conveniently utilize either of the constructions just described for the larger end, the cylindrical extension 7 of the reducer 3 being welded, if desired, to the cylindrical section 2 or joined thereto by means of the pinned type of buttstrap joint as disclosed in the Hollister et al. application and patent.

In each of the forms illustrated, Figs. 3 and 4, the transition piece 8 which forms the terminal portion of reducer 3 is uniformly tapered internally and at its larger end is made substantially equal in diameter and thickness to the corresponding dimensions of the cylindrical conduit 1 to which it is joined; and at its smaller end, substantially equal in diameter and thickness to the corresponding dimensions of the large end of conical element 6. Intermediate its ends, the thickness of the transition piece 8 is made appreciably greater as indicated at 19 and from this intermediately thickened portion the outer surface is tapered at 20 and 21 toward the respective ends to provide a gradual variation between maximum and minimum wall thicknesses. The transition piece 8 may conveniently be formed from plate stock having a substantially uniform thickness equal to the desired maximum intermediate thickness desired, the portions 22 and 23, as represented by dot-and-dash lines, being removed by machining to provide a required thickness at each end which is substantially equal to the respective thickness of the members to which the ends are connected; the finished surface 20 being cylindrical in form and substantially equal in diameter to the cylindrical end of conduit section 1, and the finished surface 21 forming a continuation of the conical exterior of element 6.

In Fig. 4, the dot-and-dash lines 24 and 25 are included to represent the internal contour of the conduit which would result if the thickened insert 8 were omitted and the cylinder 1 and cone 6 extended for connection at the line 26, the change from a large diameter to a smaller diameter in the region of the joint being greater per unit length than when the transition piece is used. In the same figure, the angle $a$ indicates the angle at which the internal dimension of the conduit is initially reduced from the large diameter of cylindrical section 1; angle $b$ the angle of departure of the conical element 6 from the conical inner surface of the transition piece 8; and angle $c$ the angle of departure if the transition piece were eliminated and a direct connection made between the cylindrical section 1 and the conical element 6; the angles $a$ and $b$ each being less than the angle $c$. The dotted lines and the indications of angles $a$, $b$ and $c$ are also applicable to Fig. 3 but have been omitted to avoid complication of that illustration.

The construction as herein described thus provides a conduit whose diameter is progressively reduced in a plurality of stages, from a relatively large diameter at the joint to a smaller dimension beyond, each stage providing a uniformly decreasing change in internal diameter of the conduit and involving a smaller angle of departure from the preceding dimension than if the total reduction were effected in a single stage within substantially the same longitudinal limits. The result is a more gradual variation in flow area than with a single angle of departure and a decrease in the stresses in the materials at the joint as compared with the stresses which would result from a direct connection between the cylindrical conduit 1 and a conical member of uniform taper and thickness throughout its length. An additional advantage lies in the increased thickness of the insert element 8 which further reduces the unit stresses; also by tapering off the edges of the insert to the thickness of the material in the cone and cylinder the stress lines are carried through the assembled structure in an easy and gradual flow between companionate parts, and undue concentration of stress is avoided in any given zone.

It is of course obvious that the invention is not confined to the specific embodiments illustrated; for example, in connecting conduits of unequal internal dimensions, a transition element may be incorporated at the juncture with the smaller conduit, in reverse of the arrangement shown, or similarly formed transition elements employed in conjunction with both conduits. Furthermore, the axes of the conduits being connected need not be aligned as shown, but may be eccentrically related, or disposed at an angle to each other, involving in some instances the use of a curved reducer fitting.

I claim:

1. A conduit reducer section for connecting conduits of different diameters and having conically formed internal surface portions of different angularity with respect to their common axis and connected to provide a progressively decreasing internal cross sectional area from end to end, at least one of said conically formed portions having a locally thickened wall portion for an intermediate length thereof.

2. A hollow connecting body for joining conduits of unequal diameters comprising a conically formed portion and a member forming a thickened extension at the larger end thereof, said extension having a cylindrically formed exterior surface at its free end and a conically formed interior surface throughout its length, the wall thickness of said extension being maintained at a substantially uniform maximum for an intermediate portion of its length and gradually diminishing in longitudinally opposite directions from said intermediate location.

3. In combination with conduits of different diameters, a joining member, conically formed interiorly and adapted for connection to one of said conduits by means including a butt strap overlapping an end portion of said member, said member having its ends registering in thickness and diameter with the ends of adjacent conduits, the wall thickness of said member being uniformly increased to a maximum at a distance from one end equal at least to the overlapping width of said butt strap and uniformly decreased from said maximum toward the opposite end of said member.

4. In combination with conduits of different diameters, a joining member of uniform conical formation interiorly and having its ends registering in thickness and diameter with the ends of the adjacent conduits, said member being adapted for connection to the conduit of larger diameter by means including a butt strap overlapping said member at its larger end, the wall thickness of said member being uniformly increased from both ends toward an intermediately located maximum, spaced from the larger end of said member a distance at least equal to the overlapping width of said butt strap.

5. A conduit reducer of progressively decreasing internal diameter from end to end and comprising initially separate sections of different angularity welded together in axial relation, the larger section having its outer surface cylindrically formed adjacent its free end, an adjacent portion of said surface being uniformly tapered from the cylindrical dimension toward its welded end to maintain a substantially uniform maximum wall thickness for an intermediate length of said section, and a succeeding portion more steeply tapered from said intermediate location to a formation registering with the adjoining section.

BENJAMIN H. MILLER.